(12) United States Patent
Cohen et al.

(10) Patent No.: US 8,415,869 B1
(45) Date of Patent: Apr. 9, 2013

(54) FLUORESCENT LAMP WITH UNDERLYING YTTRIUM VANADATE PHOSPHOR LAYER AND PROTECTIVE PHOSPHOR LAYER

(75) Inventors: William Erwin Cohen, Cleveland, OH (US); Jianmin He, Cleveland, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/242,952

(22) Filed: Sep. 23, 2011

(51) Int. Cl.
*H01J 61/44* (2006.01)

(52) U.S. Cl.
USPC .......................................... 313/486; 313/487

(58) Field of Classification Search ........... 313/484–489
See application file for complete search history.

(56) References Cited

U.S. PATENT DOCUMENTS

| | | |
|---|---|---|
| 3,858,082 A | 12/1974 | Thornton |
| 3,886,396 A | 5/1975 | Hammer et al. |
| 4,034,257 A | 7/1977 | Hoffman |
| 4,039,889 A | 8/1977 | Vicai |
| 4,208,448 A | 6/1980 | Panaccione |
| 4,241,276 A | 12/1980 | Wyner |
| 4,305,019 A | 12/1981 | Graff et al. |
| 4,315,192 A | 2/1982 | Skiwirat et al. |
| 4,315,195 A | 2/1982 | Redel et al. |
| 4,363,998 A | 12/1982 | Graff et al. |
| 4,393,330 A | 7/1983 | Skwirut et al. |
| 4,547,700 A | 10/1985 | Landry |
| 4,607,191 A | 8/1986 | Flaherty |
| 4,710,674 A | 12/1987 | Sigai |
| 4,728,459 A | 3/1988 | Fan |
| 4,925,703 A | 5/1990 | Kasenga et al. |
| 4,946,707 A | 8/1990 | Kasenga |
| 4,950,948 A | 8/1990 | Peters et al. |
| 4,952,422 A | 8/1990 | Pappalardo |
| 4,979,893 A | 12/1990 | Pappalardo et al. |
| 5,051,277 A | 9/1991 | Sigai |
| 5,087,523 A | 2/1992 | Sigai |
| 5,151,215 A | 9/1992 | Sigai |
| 5,188,763 A | 2/1993 | Chenot et al. |
| 5,196,234 A | 3/1993 | Taubner et al. |
| 5,309,069 A | 5/1994 | Sigai et al. |
| 5,602,444 A * | 2/1997 | Jansma ........................ 313/489 |
| 5,604,396 A | 2/1997 | Watanabe et al. |
| 5,612,590 A | 3/1997 | Trushell |
| 5,644,193 A | 7/1997 | Matsuda |
| 5,714,836 A | 2/1998 | Hunt et al. |

(Continued)

FOREIGN PATENT DOCUMENTS

| | | |
|---|---|---|
| DE | 2624989 A1 | 12/1976 |
| GB | 2054261 A | 2/1981 |
| JP | 2008059943 A | 3/2008 |

OTHER PUBLICATIONS

Search Report and Written Opinion from corresponding PCT Application No. PCT/US2012/055480 dated Nov. 22, 2012.

*Primary Examiner* — Joseph L Williams
(74) *Attorney, Agent, or Firm* — Pearne & Gordon LLP

(57) ABSTRACT

A fluorescent lamp includes a glass envelope that is light transmitting. There is means for providing a discharge inside the envelope. A discharge-sustaining fill of mercury and an inert gas is sealed inside the envelope. An underlying phosphor-containing layer is disposed inside the envelope. The underlying layer includes yttrium vanadate phosphor. A protective phosphor-containing layer is disposed over the underlying layer at a location that is more distal from the glass than the underlying layer.

25 Claims, 3 Drawing Sheets

U.S. PATENT DOCUMENTS

| | | |
|---|---|---|
| 6,423,248 B1 | 7/2002 | Rao |
| 6,472,812 B2 | 10/2002 | Vose et al. |
| 6,683,405 B2 | 1/2004 | Carter |
| 2009/0128742 A1* | 5/2009 | Hashimoto et al. ............. 349/70 |
| 2011/0037378 A1 | 2/2011 | Yagi et al. |

* cited by examiner

FLUORESCENT LAMP WITH UNDERLYING YTTRIUM VANADATE PHOSPHOR LAYER AND PROTECTIVE PHOSPHOR LAYER

FIELD OF THE INVENTION

This disclosure relates to fluorescent lamps and, in particular, to improving lumen maintenance of fluorescent lamps utilizing yttrium vanadate phosphor (e.g., yttrium vanadate activated with Europium or yttrium vanadate phosphate activated with Europium (and/or other activator).

BACKGROUND OF THE INVENTION

Fluorescent lamps are well known and comprise a tubular hermetically sealed glass envelope including electrodes at ends thereof. Inside the envelope is an arc discharge sustaining medium, usually at a low pressure, including inert gases and a small amount of mercury. The inside of the glass envelope is typically coated with a layer of phosphor, which absorbs ultraviolet electromagnetic radiation of 254 nm and 185 nm generated by the excited mercury arc and emits in a region of visible light.

Fluorescent lamps usually experience a gradual decrease in light output (measured in lumens) with the increase of lamp usage (measured in hours burned). Ideally, the phosphor should absorb the 254 nm and 185 nm emission strongly and convert them into visible light efficiently. But in reality, most of the 185 nm wavelength radiation is wasted, which lowers the overall efficiency of the lamp. Moreover, 185 nm emission also leads to formation of color center—a type of point defect—in phosphors, which decreases the phosphor conversion efficiency and lumen output of lamps over their life cycle. There are other notable problems associated with phosphors in fluorescent lamps. The phosphor coating is exposed to both ion bombardment and chemical reaction from the mercury discharge which is a reducing medium. In addition, during phosphor synthesis and lamp fabrication process, phosphors are usually exposed to oxygen-rich atmosphere which tend to partially oxidize reactive lower-valence ions in the phosphor lattice. These problems lead to the overall degradation of phosphors and their lumen output over life.

Yttrium vanadate phosphors (e.g., $YVO_4$: $Eu^{3+}$, $Y(P,V)O_4$: $Eu^{3+}$) strongly emitting in the deep red region, have been widely utilized in high pressure mercury lamps, and have greatly improved color rendering properties of these lamps. However, they have been excluded from current commercial use in fluorescent lamp manufacturing because of their very severe lumen depreciation during lamp operation.

BRIEF DESCRIPTION OF THE INVENTION

In general, this disclosure features a fluorescent lamp comprising a glass envelope that is light transmitting. There is means for providing a discharge inside the envelope (e.g., electrodes that are spaced apart in inside the envelope). A discharge-sustaining fill of mercury and an inert gas are sealed inside the envelope. An underlying phosphor-containing layer is disposed inside the envelope. The underlying layer comprises yttrium vanadate phosphor (e.g., $Y(P,V)O_4$: $Eu^{3+}$ and/or $YVO_4$: $Eu^{3+}$); this means yttrium vanadate phosphate activated with europium or yttrium vanadate activated with europium, respectively, as is known in the art. A protective phosphor-containing layer is disposed over the underlying layer at a location that is more distal from the glass than the underlying layer. That is, the protective layer is closer to the discharge than the underlying layer is.

Regarding more specific features, the protective layer may inhibit reaction of the underlying layer (i.e., the yttrium vanadate phosphor therein) with the mercury. Other layers could be disposed under the underlying layer, between the underlying and protective layer, and on top of the protective layer. A barrier layer can be disposed between the glass and the underlying layer, wherein the barrier layer comprises alumina or silica.

The protective layer or the underlying layer can comprise a phosphor selected from the group consisting of $Y_2O_3$: $Eu^{3+}$ (YEO); $BaMg_2Al_{16}O_{27}$: $Eu^{2+}$ (BAM); $BaMg_2Al_{16}O_{27}$: $Eu^{2+}$, $Mn^{2+}$ (BAMn); $GdMgB_5O_{10}$: $Ce^{3+}$, $Mn^{3+}$ (CBM); $MgAl_{11}O_{19}$:$Ce^{3+}$, $Tb^{3+}$ (CAT); $GdMgB_5O_{10}$: $Ce^{3+}$, $Tb^{3+}$ (CBT); $LaPO_4$: $Ce^{3+}$, $Tb^{3+}$ (LAP); $(Sr,Ba,Ca)_5(PO_4)_3Cl$: $Eu^{2+}$ (SECA); $(Ca,Ba,Sr)_5(PO_4)_3(F,Cl)$:$Sb^{3+}$, $Mn^{2+}$ (halophosphate), and combinations thereof. The phosphor of the protective layer can comprise YEO, LAP and SECA. The phosphor of the underlying layer can comprise yttrium vanadate phosphor, LAP and SECA. The phosphor of the protective layer can comprise YEO, LAP and SECA while the phosphor of the underlying layer can comprise yttrium vanadate phosphor, LAP and SECA.

A ratio of a surface density of the protective layer to a surface density of the underlying layer can be at least about 0.5:1, in particular, at least about 1.0:1. A surface density of the underlying layer can be not more than about 2.2 mg/cm², in particular not more than about 1.6 mg/cm².

A more specific aspect of this disclosure features a fluorescent lamp comprising a glass envelope that is light transmitting. Electrodes are spaced apart in the envelope for providing a discharge inside the envelope. A discharge-sustaining fill of mercury and an inert gas are sealed inside the envelope. An underlying phosphor-containing layer is disposed inside the envelope. The underlying layer comprises at least one of yttrium vanadate activated with europium and yttrium vanadate phosphate activated with europium and/or other activator (e.g., $YVO_4$: $Eu^{3+}$, $Y(P,V)O_4$: $Eu^{3+}$). A protective phosphor-containing layer is disposed over the underlying layer at a location that is more distal from the glass than the underlying layer. Any of the specific features discussed above with regard to the general embodiment, may be used in any combination in connection with this more specific aspect of the disclosure.

Regarding further specific features of the lamp performance, more desirable is a color rendering index (CRI) of at least 87 or lumens per watt (LPW) of at least 89. A correlated color temperature (CCT) of the lamp, as defined by the x-y chromaticity coordinates as provided on the x-y chromaticity diagram of the ICI system, ranges from 2700° K to 6500° K. The x-y chromaticity of the underlying layer could be different than that of the protective layer. Other layers could be disposed under the underlying layer, between the underlying and protective layer, and on top of the protective layer. A barrier layer can be disposed between the glass and the underlying layer. The barrier layer can comprise alumina or silica.

Many additional features, advantages and a fuller understanding of the invention will be had from the accompanying drawings and the Detailed Description of the Invention that follows. It should be understood that the above Brief Description of the Invention describes the invention in broad terms while the following Detailed Description of the Invention describes the invention more narrowly and presents embodiments that should not be construed as necessary limitations of the broad invention as defined in the claims.

DETAILED DESCRIPTION OF THE INVENTION

Figure 1:
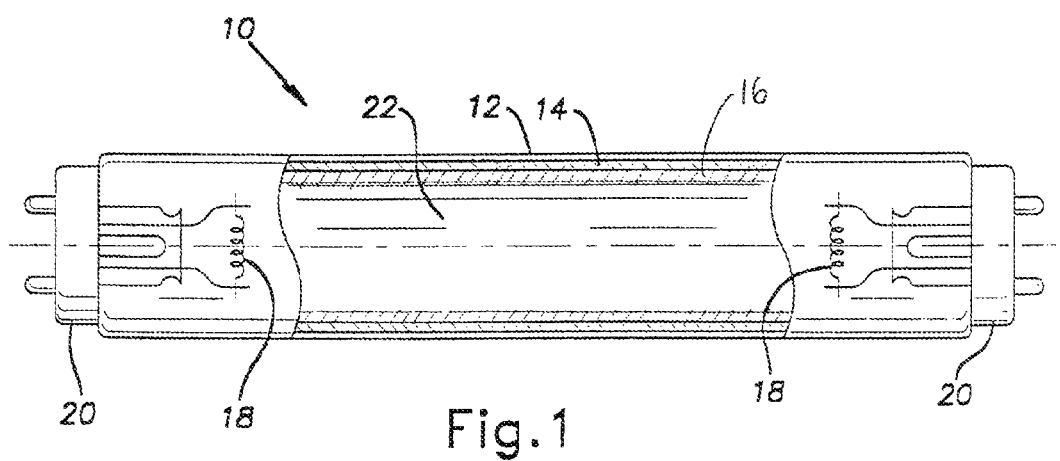
FIG. 1 shows diagrammatically, and partially in section, a fluorescent lamp made according to this disclosure.

This disclosure features a fluorescent lamp comprising a glass envelope that is light transmitting. There is means for providing a discharge inside the envelope. A discharge-sustaining fill of mercury and an inert gas is sealed inside the envelope. An underlying phosphor-containing layer is disposed inside the envelope. The underlying layer comprises yttrium vanadate phosphor. A protective phosphor-containing layer is disposed over the underlying layer at a location that is more distal from the glass than the underlying layer. Any phosphor can be used in addition to the yttrium vanadate phosphor in the underlying layer. Any phosphor can be used in the protective layer; it may prevent reaction of the yttrium vanadate with mercury of the discharge.

Regarding more specific aspects of this disclosure the yttrium vanadate comprises at least one of yttrium vanadate activated with europium ($YVO_4:Eu^{3+}$) emitting red light with a peak wavelength of 595,620,700 nm and yttrium vanadate phosphate activated with europium ($Y(P,V)O_4: Eu^{3+}$). The protective layer may inhibit reaction of the underlying layer with the mercury of the discharge-sustaining fill.

The underlying layer or the protective layer comprise a phosphor selected from the group consisting of $Y_2O_3: Eu^{3+}$ (YEO) emitting red-orange light with a peak wavelength of 611 nm; $BaMg_2Al_{16}O_{27}: Eu^{2+}$ (BAM) emitting blue light with a peak wavelength of 450 nm; $BaMg_2Al_{16}O_{27}: Eu^{2+}$, $Mn^{2+}$ (BAMn) emitting blue-green light with a peak wavelength of 450/515 nm; $GdMgB_5O_{10}: Ce^{3+}, Mn^{3+}$ (CBM) emitting red light with a peak wavelength of 625 nm; $MgAl_{11}O_{19}:Ce^{3+}, Tb^{3+}$ (CAT) emitting green light with a peak wavelength of 543 nm; $GdMgB_5O_{10}: Ce^{3+}, Tb^{3+}$ (CBT) emitting green light with a peak wavelength of 545 nm; $LaPO_4: Ce^{3+}, Tb^{3+}$ (LAP) emitting green light with a peak wavelength of 544 nm; $(Sr,Ba,Ca)_5(PO_4)_3Cl: Eu^{2+}$ (SECA) emitting blue light with a peak wavelength of 445-470 nm; $(Ca,Ba,Sr)_5(PO_4)_3(F,Cl):Sb^{3+}, Mn^{2+}$ (halophosphor), for example, $Ca_5(PO_4)_3(F,Cl):Sb^{3+}, Mn^{2+}$ (calcium halophosphate) emitting white light, and combinations thereof. In particular, the phosphor of the protective layer comprises YEO, LAP and SECA and the phosphor of the underlying layer comprises yttrium vanadate phosphor, LAP and SECA. Alumina or silica may be included in the underlying layer and in the protective layer. The amounts and types of each phosphor in the underlying layer and in the protective layer can be selected to produce the desired CCT of the lamp (2700° K to 6500° K) as would be understood by one of ordinary skill in the art in view of this disclosure.

The fluorescent lamp 10 has a light-transmissive glass tube or envelope 12 which has a circular cross-section. The inner surface of the glass envelope is provided with an underlying layer 14. The protective layer 16 is disposed on top of the underlying layer. The protective layer is farther away from the glass than is the underlying layer. Other layers could be disposed under the underlying layer, between the underlying and protective layer and on top of the protective layer. The lamp is hermetically sealed by bases 20 attached at both ends, and a pair of spaced electrode structures 18 at each end of the lamp (which are means for providing a discharge) are respectively mounted on the bases 20. A discharge-sustaining fill 22 of mercury and an inert gas is sealed inside the glass tube. The inert gas is typically argon or a mixture of argon and other noble gases at low pressure which, in combination with a small quantity of mercury, provide the low vapor pressure manner of operation.

The underlying layer 14 and protective layer 16 are preferably utilized in a low pressure mercury vapor discharge lamp, but may also be used in a high pressure mercury vapor discharge lamp. As used herein, a "fluorescent lamp" is any mercury vapor discharge fluorescent lamp as known in the art, including fluorescent lamps having electrodes, and electrodeless fluorescent lamps where the means for providing a discharge include a radio transmitter adapted to excite mercury vapor atoms via transmission of an electromagnetic signal. A "T8 lamp" can be used in this disclosure and is a fluorescent lamp as known in the art, e.g., linear, nominally 48 inches in length, and having a nominal outer diameter of 1 inch (eight times ⅛ inch, which is where the "8" in "T8" comes from). The T8 fluorescent lamp can also be nominally 2, 3, 6 or 8 feet long, or some other length. T5 and T12 fluorescent lamps known in the art can also utilize the underlying and protective layers of this disclosure. The fluorescent lamp can have a "non-straight glass envelope" which includes (but is not limited to) a glass envelope or tube which is in the shape of an L or a U (such as a 4 foot T8 or T12 lamp bent into a U-shape), a circular glass envelope as is known in the art, the glass envelope of a compact fluorescent lamp (e.g., a helical compact fluorescent lamp), and other glass envelopes which are not a straight cylindrical glass envelope. Compact fluorescent lamps are well known; see U.S. Pat. Nos. 2,279,635; 3,764,844; 3,899,712; 4,503,360; 5,128,590; 5,243,256; 5,451,104; and German Patent Application No. DE 4133077 filed in Germany on Oct. 2, 1991.

The underlying layer 14 and protective layer 16 are provided on the lamp as follows. The underlying layer coating is prepared as codispersion of phosphor particles in an aqueous vehicle containing colloidal alumina or silica The alumina or silica is about 10 weight % to 50 weight % of the total amount of phosphor used in the underlying layer. The coating formulation is typically kept slightly basic by use of ammonia. Then an acrylic-based thickener, typically, is added together with surfactants. The suspension is then applied as a coating to the inside of the glass tube used to make the fluorescent lamp and heated to dry, as is known in the art. The phosphor-containing underlying layer is applied so that the weight of phosphor in the layer (the "coating weight") is 0.5-3, more specifically, 0.8-2 mg/cm$^2$.

The phosphor powder of the protective layer is first dispersed in a water vehicle containing colloidal alumina or silica with a dispersing agent such as ammonium polyacrylate and a nonionic surfactant such as nonylphenyl-ethoxylate, though any suitable nonionic surfactant can be used. The alumina or silica is about 0.2-4 weight % of the phosphor used in the protective layer. Then a thickener is added as a viscosity controlling agent, typically polyethylene oxide having a molecular weight in the range of 200,000 to 1,000,000 g/mol, and optionally other dispersing agents, surfactants, and thickeners known in the art may be added. The resulting suspension is typically about 20-40 weight percent phosphor powder, 0.05-2 weight percent dispersing agent, 1-3 weight percent surfactant and 1-5 weight percent thickener, with the balance being water totaling 100% by weight. The suspension is then applied as a coating to the inside of the glass tube which is already coated with the underlying coating as described above, and heated to dry, as is known in the art. The phosphor-containing protective layer is applied so that the weight of phosphor in the layer (the "coating weight") is 0.5-3, more specifically, 0.8-2, more specifically, 1-1.6 mg/cm$^2$.

In one aspect, the lamp has no more than two layers inside the glass envelope, these being the described underlying layer and the protective layer. This protective layer faces the arc or is closer to the arc than is the glass envelope. The lamp may have a barrier layer of alumina or silica between the underlying layer 14 and the glass tube 12. In this case the underlying layer is still closer to the arc than the barrier layer.

The disclosure will now be described by reference to the following examples, which should not be used in any way to limit the invention that is described by the following claims.

Example 1

Five T8 lamps with glass envelopes each having a surface area of 972.88 cm$^2$, a diameter of 25.4 mm and a length of 1219.2 mm were coated with an underlying layer followed by a protective layer each having the following phosphor weight percentage compositions shown in Table 1 and made following the method in the Detailed Description. Each lamp was filled with argon at a fill pressure in the range of 2.0 to 3.5 ton and a dose of mercury in the range of 2.0 to 4.0 mg. The color points of each of the phosphor layers are provided.

TABLE 1

| protective layer | YEO | 61.9% |
|---|---|---|
|  | LAP | 28.7% |
|  | SECA | 9.6% |
|  | CCX | 0.4122 |
|  | CCY | 0.3931 |
| underlying layer | Yttrium Vanadate | 41.9% |
|  | LAP | 42.9% |
|  | SECA | 15.2% |
|  | CCX | 0.4068 |
|  | CCY | 0.4070 |

The yttrium vanadate phosphor that was used was yttrium vanadate phosphate Y(P,V)O$_4$: Eu$^{3+}$.

Each of the layers was coated on the lamps according to the following surface densities in the unit of mg/cm$^2$ and to have the following ratio of coating surface densities shown in Table 2. Lamps of cell B had no protective layer. A "cell" is a group of similar lamps.

TABLE 2

| cell | Lamp | Underlying layer surface density (mg/cm$^2$) | Protective layer surface density (mg/cm$^2$) | Protective/ Underlying layer surface density ratio |
|---|---|---|---|---|
| A | 1 | 2.61 | 0.5 | 0.19 |
| A | 2 | 2.51 | 0.57 | 0.23 |
| A | 3 | 2.58 | 0.54 | 0.21 |
| A | 4 | 2.58 | 0.58 | 0.22 |
| A | 5 | 2.59 | 0.58 | 0.22 |
| average |  | 2.57 | 0.55 | 0.22 |
| B | 1 | 2.57 | 0 | 0.00 |
| B | 2 | 2.61 | 0 | 0.00 |
| B | 3 | 2.6 | 0 | 0.00 |
| B | 4 | 2.59 | 0 | 0.00 |
| B | 5 | 2.6 | 0 | 0.00 |
| average |  | 2.59 | 0.00 | 0.00 |
| C | 1 | 2.16 | 1.01 | 0.47 |
| C | 2 | 2.15 | 0.97 | 0.45 |
| C | 3 | 2.12 | 1.01 | 0.48 |
| C | 4 | 2.11 | 1.06 | 0.50 |
| C | 5 | 2.04 | 1.06 | 0.52 |
| average |  | 2.12 | 1.02 | 0.48 |
| D | 1 | 1.59 | 1.48 | 0.93 |
| D | 2 | 1.47 | 1.45 | 0.99 |
| D | 4 | 1.51 | 1.55 | 1.03 |
| D | 5 | 1.52 | 1.5 | 0.99 |
| average |  | 1.52 | 1.50 | 0.98 |

Figure 2:
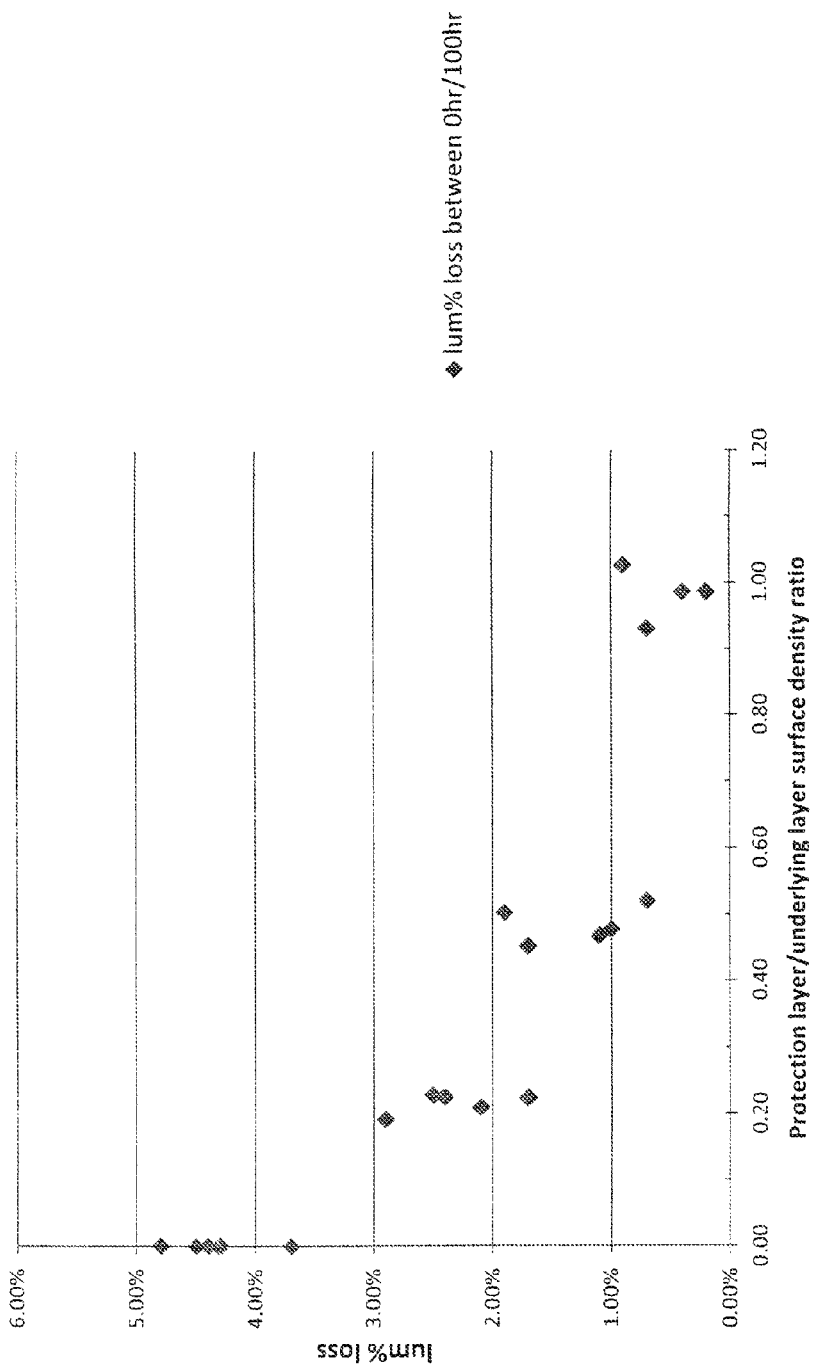
FIG. 2 is a graph of lumen loss between 0 and 100 hours of lamp burning ("lumen % loss") as a function of a ratio of surface density of a protective phosphor layer to a surface density of an underlying phosphor layer.

The lamps were burned for 100 hours and the lumen loss between 0 and 100 hours was measured and given on the y axis of FIG. 2 ("lumen % loss"). It can be seen that the lumen % loss decreased at an average surface density ratio of about 0.5 (protective layer surface density/underlying layer surface density) compared to an average surface density of about 0.2. The lumen % loss decreased still further at an average surface density ratio of about 1.0 compared to at the average surface density ratio of about 0.5.

The following Table 3 shows lamp properties after 100 hours of burning.

TABLE 3

| Cell/ Lamp | Lamp Volts | Total Watts | ccx | ccy | CRI | CCT | Lumens | Lamp LPW |
|---|---|---|---|---|---|---|---|---|
| A/1 | 139.8 | 32.6 | 0.4086 | 0.4067 | 85.4 | 3556 | 2573.5 | 78.94 |
| A/2 | 140.1 | 32.8 | 0.4087 | 0.4054 | 85.6 | 3544 | 2597.2 | 79.18 |
| A/3 | 142.8 | 33 | 0.4075 | 0.4037 | 85.5 | 3556 | 2588.7 | 78.45 |
| A/4 | 142.4 | 32.9 | 0.4079 | 0.4045 | 85.5 | 3553 | 2562 | 77.87 |
| A/5 | 142.5 | 33.2 | 0.4081 | 0.4046 | 85.6 | 3550 | 2595.5 | 78.18 |
| Ave. | 141.5 | 32.9 | 0.4082 | 0.4050 | 85.5 | 3552 | 2583.4 | 78.52 |
| B/1 | 142.4 | 33.1 | 0.4068 | 0.4066 | 80.2 | 3500 | 2424.9 | 73.26 |
| B/2 | 140 | 32.7 | 0.4068 | 0.4073 | 80.1 | 3506 | 2410.2 | 73.71 |
| B/3 | 140.5 | 32.9 | 0.4059 | 0.4077 | 79.8 | 3528 | 2428.4 | 73.81 |
| B/4 | 139.6 | 32.7 | 0.4061 | 0.4065 | 80 | 3517 | 2425.7 | 74.18 |
| B/5 | 141.1 | 32.9 | 0.4084 | 0.4068 | 80.6 | 3565 | 2412.1 | 73.32 |
| Ave. | 140.7 | 32.86 | 0.4068 | 0.4070 | 80.1 | 3503 | 2420.3 | 73.66 |
| C/1 | 140.3 | 32.6 | 0.4203 | 0.3992 | 86.8 | 3262 | 2681.1 | 82.24 |
| C/2 | 146.6 | 33.3 | 0.419 | 0.3988 | 86.7 | 3283 | 2661.6 | 79.93 |
| C/3 | 141.9 | 33 | 0.4201 | 0.3989 | 86.7 | 3261 | 2674 | 81.03 |
| C/4 | 140.6 | 32.8 | 0.421 | 0.3992 | 86.7 | 3247 | 2682.6 | 81.79 |
| C/5 | 141.8 | 33.1 | 0.4194 | 0.3983 | 86.6 | 3271 | 2682.8 | 81.05 |
| Ave. | 142.2 | 32.96 | 0.4200 | 0.3989 | 86.7 | 3265 | 2676.6 | 81.2 |
| D/1 | 143.2 | 33 | 0.4222 | 0.397 | 86.7 | 3205 | 2741.4 | 83.07 |
| D/2 | 142.9 | 33.1 | 0.4223 | 0.3964 | 86.7 | 3200 | 2746.8 | 82.98 |
| D/4 | 141.4 | 33 | 0.4211 | 0.3952 | 86.6 | 3211 | 2788.1 | 84.49 |
| D/5 | 142.5 | 33.1 | 0.4226 | 0.3975 | 86.7 | 3202 | 2747.3 | 83 |
| Ave. | 142.5 | 33.05 | 0.4221 | 0.3965 | 86.7 | 3205 | 2755.9 | 83.4 |

These lamps of Table 3 had the phosphor compositions shown in Table 1 and the surface density and surface density ratios shown in Table 2. It can be seen that the lamps having a surface density ratio of about 0.5 and about 1.0 (cells C and D of the invention) favorably had CRI values of about 87 and the highest LPW of all the lamp cells. This is consistent with what one, who is skilled in the art, with knowledge of the present disclosure might expect. With increase of the coating surface density ratio, light emission from the protective layer containing YEO increasingly contributes to the total light emission of the lamp which also includes light emission from the underlying layer containing Y(P,V)O$_4$: Eu$^{3+}$ red. Therefore, LPW and CRI are both improved. The lamps of cell B which had no protective layer had the lowest CRI of all of the cells. The lamps of cell B also had the highest lumen % loss of any of the other cells (FIG. 2), which highlights the effectiveness of the protective layer in protecting the yttrium vanadate phosphate phosphor of the underlying layer and reducing the lumen % loss.

Example 2

The same lamps described above in Example 1 having the same surface density, protective layer/underlying layer surface density ratio, and phosphor compositions were used to produce 500 hour lamp data.

Figure 3:
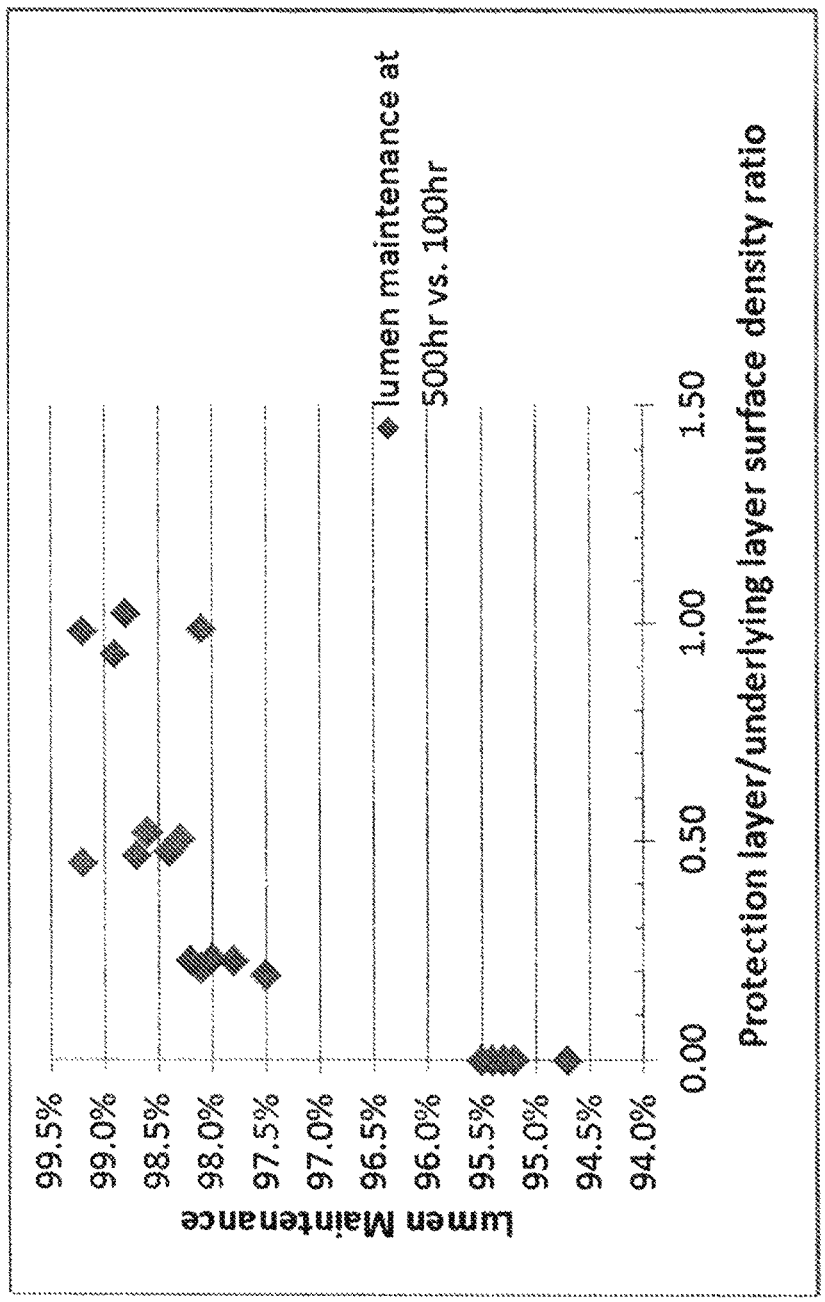
FIG. 3 is a graph of % lumens maintained at 500 hours of lamp burning compared to at 100 hours lamp burning as a function of a ratio of surface density of a protective phosphor layer to a surface density of an underlying phosphor layer.

The percentage of the lumens maintained at 500 hours compared to the lumens at 100 hours on the y axis ("lumen maintenance") was plotted as a function of the protective layer/underlying layer surface density ratio ("surface density ratio") in FIG. 3. This figure shows that the lumen percentage maintained was at least about 97.5% at a surface density ratio of about 0.2, which is greater than the 95.5% highest lumen % maintained at a surface density ratio of 0 with no protective layer. This shows the effectiveness of the protective layer. The surface density ratios of about 0.5 and about 1.0 produced even better % lumen maintenance of at least about 98.0.

Lamp cells C and D of the invention, which had an average surface density ratio of about 0.50 and about 1.00 favorably had a CRI of about 87 and an average LPW above 80. Lamp cells B that had no protective layer had the lowest CRI and LPW of any of the lamp cells.

Measurements of lamp properties were conducted as known in the art and as described in the "Approved Method Electrical and Photometric Measurements of Fluorescent Lamps," IES LM-9-09, IES Illuminating Engineering Society, which is incorporated herein by reference in its entirety.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A fluorescent lamp comprising:
a glass envelope that is light transmitting;
means for providing a discharge inside said envelope;
a discharge-sustaining fill of mercury and an inert gas sealed inside said envelope;
an underlying phosphor-containing layer disposed inside said envelope, said underlying layer comprising yttrium vanadate phosphor; and
a protective phosphor-containing layer disposed as a separate coating over said underlying layer at a location that is more distal from said glass than said underlying layer, wherein said protective phosphor-containing layer does not include yttrium vanadate phosphor.

2. The fluorescent lamp of claim 1 wherein said yttrium vanadate phosphor of said underlying layer comprises at least one of yttrium vanadate activated with europium and yttrium vanadate phosphate activated with europium and/or other activator.

3. The fluorescent lamp of claim 1 wherein said protective layer inhibits reaction of said underlying layer with said mercury.

4. The fluorescent lamp of claim 1 wherein said protective layer or said underlying layer comprise a phosphor selected from the group consisting of $Y_2O_3$: $Eu^{3+}$ (YEO); $BaMg_2Al_{16}O_{27}$: $Eu^{2+}$ (BAM); $BaMg_2Al_{16}O_{27}$: $Eu^{2+}$, $Mn^{2+}$ (BAMn); $GdMgB_5O_{10}$: $Ce^{3+}$, $Mn^{3+}$ (CBM); $MgAl_{11}O_{19}$: $Ce^{3+}$, $Tb^{3+}$ (CAT); $GdMgB_5O_{10}$: $Ce^{3+}$, $Tb^{3+}$ (CBT)); $LaPO_4$: $Ce^{3+}$, $Tb^{3+}$ (LAP); $(Sr,Ba,Ca)_5(PO_4)_3Cl$: $Eu^{2+}$ (SECA); $(Ca,Ba,Sr)_5(PO_4)_3(F,Cl):Sb^{3+}$, $Mn^{2+}$ (halophosphate), and combinations thereof.

5. The fluorescent lamp of claim 4 wherein said phosphor of said protective layer comprises YEO, LAP and SECA.

6. The fluorescent lamp of claim 4 wherein said phosphor of said underlying layer comprises said yttrium vanadate phosphor, LAP and SECA.

7. The fluorescent lamp of claim 4 wherein said phosphor of said protective layer comprises YEO, LAP and SECA and said phosphor of said underlying layer comprises said yttrium vanadate phosphor, LAP and SECA.

8. The fluorescent lamp of claim 1 wherein said means for providing a discharge inside said envelope comprises electrodes spaced apart inside said envelope.

9. The fluorescent lamp of claim 1 comprising a barrier layer disposed between said glass and said underlying layer, wherein said barrier layer comprises alumina or silica.

10. The fluorescent lamp of claim 1 wherein a ratio of a surface density of said protective layer to a surface density of said underlying layer is at least about 0.5:1.

11. The fluorescent lamp of claim 1 wherein a ratio of a surface density of said protective layer to a surface density of said underlying layer is at least about 1.0:1.

12. The fluorescent lamp of claim 10 wherein a surface density of said underlying layer is not more than about 2.2 mg/cm².

13. The fluorescent lamp of claim 11 wherein a surface density of said underlying layer is not more than about 1.6 mg/cm².

14. A fluorescent lamp comprising:
a glass envelope that is light transmitting;
electrodes spaced apart in said envelope for providing a discharge inside said envelope;
a discharge-sustaining fill of mercury and an inert gas sealed inside said envelope;
an underlying phosphor-containing layer disposed inside said envelope, said underlying layer comprising at least one of yttrium vanadate activated with europium and yttrium vanadate phosphate activated with europium and/or other activator; and
a protective phosphor-containing layer disposed as a separate coating over said underlying layer at a location that is more distal from said glass than said underlying layer wherein said protective phosphor-containing layer does not include yttrium vanadate phosphor.

15. The fluorescent lamp of claim 14 wherein said protective layer inhibits reaction of said underlying layer with said mercury.

16. The fluorescent lamp of claim 14 wherein said protective layer comprises a phosphor selected from the group consisting of $Y_2O_3$: $Eu^{3+}$ (YEO); $BaMg_2Al_{16}O_{27}$: $Eu^{2+}$ (BAM); $BaMg_2Al_{16}O_{27}$: $Eu^{2+}$, $Mn^{2+}$ (BAMn); $GdMgB_5O_{10}$: $Ce^{3+}$, $Mn^{3+}$ (CBM); $MgAl_{11}O_{19}:Ce^{3+}$, $Tb^{3+}$ (CAT); $GdMgB_5O_{10}$: $Ce^{3+}$, $Tb^{3+}$ (CBT); $LaPO_4$: $Ce^{3+}$, $Tb^{3+}$ (LAP); $(Sr,Ba,Ca)_5(PO_4)_3Cl$: $Eu^{2+}$ (SECA); $(Ca,Ba,Sr)_5(PO_4)_3(F,Cl):Sb^{3+}$, $Mn^{2+}$ (halophosphate), and combinations thereof.

17. The fluorescent lamp of claim 16 wherein said phosphor of said protective layer comprises YEO, LAP and SECA.

18. The fluorescent lamp of claim 16 wherein said phosphor of said underlying layer comprises said yttrium vanadate phosphor, LAP and SECA.

19. The fluorescent lamp of claim 16 wherein said phosphor of said protective layer comprises YEO, LAP and SECA and said phosphor of said underlying layer comprises said yttrium vanadate phosphor, LAP and SECA.

20. The fluorescent lamp of claim 14 wherein a ratio of a surface density of said protective layer to a surface density of said underlying layer is at least about 0.5:1.

21. The fluorescent lamp of claim 14 wherein a ratio of a surface density of said protective layer to a surface density of said underlying layer is at least about 1.0:1.

22. The fluorescent lamp of claim 14 wherein a surface density of said underlying layer is not more than about 2.2 mg/cm$^2$.

23. The fluorescent lamp of claim 14 wherein a surface density of said underlying layer is not more than about 1.6 mg/cm$^2$.

24. The fluorescent lamp of claim 14 comprising a barrier layer disposed between said glass and said phosphor containing layer, wherein said barrier layer comprises alumina or silica.

25. A fluorescent lamp comprising:
a glass envelope that is light transmitting;
electrodes spaced apart in said envelope for providing a discharge inside said envelope;
a discharge-sustaining fill sealed inside said envelope;
an underlying phosphor-containing layer disposed inside said envelope, said underlying layer comprising at least one of yttrium vanadate activated with europium and yttrium vanadate phosphate activated with europium and/or other activator; and
a protective phosphor-containing layer disposed as a separate coating over said underlying layer at a location that is more distal from said glass than said underlying layer, wherein said protective phosphor-containing layer does not include yttrium vanadate phosphor.

* * * * *

UNITED STATES PATENT AND TRADEMARK OFFICE
CERTIFICATE OF CORRECTION

PATENT NO. : 8,415,869 B1  
APPLICATION NO. : 13/242952  
DATED : April 9, 2013  
INVENTOR(S) : William Erwin Cohen and Jianmin He Page 1 of 1

It is certified that error appears in the above-identified patent and that said Letters Patent is hereby corrected as shown below:

On the Title Page, after item (22), insert:

--(65)           Prior Publication Data
    US 2013/0076227 A1    Mar. 28, 2013--

In the Specifications:

In column 5, line 24, delete "ton" and replace with "torr"

Signed and Sealed this
Ninth Day of July, 2013

Teresa Stanek Rea
*Acting Director of the United States Patent and Trademark Office*